(12) United States Patent
Chen et al.

(10) Patent No.: US 10,063,760 B2
(45) Date of Patent: Aug. 28, 2018

(54) PHOTOGRAPHING CONTROL METHODS AND DEVICES

(71) Applicant: Xiaomi Inc., Beijing (CN)

(72) Inventors: Zhijun Chen, Beijing (CN); Tao Zhang, Beijing (CN); Song Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 253 days.

(21) Appl. No.: 14/811,932

(22) Filed: Jul. 29, 2015

(65) Prior Publication Data
US 2016/0119530 A1    Apr. 28, 2016

Related U.S. Application Data

(63) Continuation of application No. PCT/CN2015/075162, filed on Mar. 26, 2015.

(30) Foreign Application Priority Data

Oct. 23, 2014  (CN) .......................... 2014 1 0571904

(51) Int. Cl.
*H04N 5/232*  (2006.01)
*G03B 17/00*  (2006.01)
(Continued)

(52) U.S. Cl.
CPC .......... *H04N 5/23203* (2013.01); *G06F 3/00* (2013.01); *H04N 5/225* (2013.01); *H04N 5/23251* (2013.01)

(58) Field of Classification Search
CPC ...... G06F 1/163; G06F 3/017; G06F 15/0208; G06F 3/014; G06F 3/013; G06F 3/015;
(Continued)

(56) References Cited

U.S. PATENT DOCUMENTS 7,957,468 B2    6/2011  Lin
9,420,856 B2 *  8/2016  Proud ................. A44C 5/0015
(Continued)

FOREIGN PATENT DOCUMENTS

CN    101742114 A    6/2010
CN    201570011 U    9/2010
(Continued)

OTHER PUBLICATIONS

International Search Report of PCT/CN2015/075162, mailed from the State Intellectual Property Office of China dated Jul. 30, 2015.
(Continued)

*Primary Examiner* — Chia-Wei A Chen
(74) *Attorney, Agent, or Firm* — Finnegan, Henderson, Farabow, Garrett & Dunner LLP

(57) ABSTRACT

A photographing control method for use in a mobile terminal, includes: detecting whether the mobile terminal is in a photographing mode; sending an action-collecting instruction to a wearable device if the mobile terminal is in the photographing mode, for the wearable device to collect a motion trajectory of the wearable device according to the action-collecting instruction; receiving the motion trajectory collected by the wearable device; judging whether the received motion trajectory is a preset motion trajectory; and triggering the mobile terminal to take a photo if the received motion trajectory is the preset motion trajectory.

10 Claims, 17 Drawing Sheets

(51) Int. Cl.
*H04N 5/225* (2006.01)
*G06F 3/00* (2006.01)

(58) Field of Classification Search
CPC ...... G06F 3/016; G06F 3/0205; G06F 3/0202; G04C 3/002; H04N 5/23203; H04N 5/23251; H04N 21/42201
See application file for complete search history.

(56) References Cited

U.S. PATENT DOCUMENTS

| | | | |
|---|---|---|---|
| 9,618,970 B2* | 4/2017 | Lee | G06F 1/163 |
| 9,813,864 B2* | 11/2017 | Dvortsov | H04W 4/023 |
| 2007/0153908 A1 | 7/2007 | Lin | |
| 2008/0220809 A1 | 9/2008 | Hansen | |
| 2009/0054067 A1 | 2/2009 | Gauthier et al. | |
| 2009/0162047 A1 | 6/2009 | Wang | |
| 2010/0219989 A1* | 9/2010 | Asami | G06F 3/014 341/20 |
| 2011/0221948 A1 | 9/2011 | Saito | |
| 2012/0025946 A1 | 2/2012 | Chuang | |
| 2012/0108351 A1* | 5/2012 | Tamura | A63B 24/0021 473/213 |
| 2013/0155255 A1 | 6/2013 | Yu | |
| 2013/0194066 A1* | 8/2013 | Rahman | G05B 1/01 340/5.51 |
| 2013/0329074 A1* | 12/2013 | Zhang | H04N 5/2258 348/222.1 |
| 2014/0028546 A1* | 1/2014 | Jeon | G06F 3/014 345/156 |
| 2014/0139422 A1* | 5/2014 | Mistry | G06F 3/014 345/156 |
| 2014/0143737 A1* | 5/2014 | Mistry | G06F 3/0488 715/854 |
| 2014/0143785 A1* | 5/2014 | Mistry | G06F 1/163 718/104 |
| 2014/0160078 A1* | 6/2014 | Seo | G06F 3/017 345/175 |
| 2014/0219515 A1* | 8/2014 | Karakotsios | G06K 9/00355 382/115 |
| 2014/0229845 A1* | 8/2014 | Ivanich | H04N 5/4403 715/743 |
| 2014/0267742 A1* | 9/2014 | Tapia | H04N 7/183 348/157 |
| 2014/0327794 A1 | 11/2014 | Saito | |
| 2015/0073907 A1* | 3/2015 | Purves | G06Q 20/32 705/14.58 |
| 2015/0091780 A1* | 4/2015 | Lyren | G02B 27/017 345/8 |
| 2015/0103196 A1* | 4/2015 | Shin | H04N 5/23203 348/211.1 |
| 2015/0185826 A1* | 7/2015 | Mullins | G06T 19/006 345/633 |
| 2015/0195452 A1 | 7/2015 | Saito | |
| 2015/0220154 A1* | 8/2015 | Midholt | G06F 3/014 345/156 |
| 2015/0227245 A1* | 8/2015 | Inagaki | G06F 3/0412 345/173 |
| 2015/0258431 A1* | 9/2015 | Stafford | A63F 13/213 463/31 |
| 2015/0286285 A1* | 10/2015 | Pantelopoulos | A61B 5/6802 345/156 |
| 2015/0309582 A1* | 10/2015 | Gupta | G06F 3/011 345/156 |
| 2015/0332031 A1* | 11/2015 | Mistry | G06F 21/316 726/19 |
| 2015/0346828 A1* | 12/2015 | Chen | G06F 3/017 345/156 |
| 2015/0347080 A1* | 12/2015 | Shin | G09G 3/001 345/173 |
| 2015/0350403 A1* | 12/2015 | Eim | G06F 1/163 455/420 |
| 2016/0006850 A1* | 1/2016 | Ohki | H04M 1/7253 455/557 |
| 2016/0021291 A1* | 1/2016 | Freund | H04N 5/23203 348/211.2 |
| 2016/0036965 A1* | 2/2016 | Kim | H04M 1/72577 455/411 |
| 2016/0037055 A1* | 2/2016 | Waddington | H04N 5/23206 348/211.8 |
| 2016/0044151 A1* | 2/2016 | Shoemaker | H04M 19/04 455/556.1 |
| 2016/0065831 A1* | 3/2016 | Howard | H04N 5/23206 348/211.2 |
| 2016/0085266 A1* | 3/2016 | Lee | H04N 5/2628 348/240.2 |
| 2016/0091952 A1* | 3/2016 | Xu | G06F 1/3206 713/323 |
| 2016/0104037 A1* | 4/2016 | Li | G06K 9/00335 348/77 |
| 2016/0109861 A1* | 4/2016 | Kim | G04G 21/08 368/69 |
| 2016/0179197 A1 | 6/2016 | Qian et al. | |
| 2016/0329053 A1* | 11/2016 | Grahm | G06F 1/163 |
| 2017/0052598 A1* | 2/2017 | Amento | G06F 3/017 |
| 2017/0161642 A1* | 6/2017 | Faaborg | G06N 99/005 |
| 2017/0310865 A1* | 10/2017 | Zhou | H04N 5/2327 |

FOREIGN PATENT DOCUMENTS

| | | |
|---|---|---|
| CN | 101930282 | 12/2010 |
| CN | 102395941 | 3/2012 |
| CN | 102420942 A | 4/2012 |
| CN | 103167230 A | 6/2013 |
| CN | 103217895 A | 7/2013 |
| CN | 103237169 A | 8/2013 |
| CN | 103237172 A | 8/2013 |
| CN | 103442175 A | 12/2013 |
| CN | 103472914 A | 12/2013 |
| CN | 103500335 A | 1/2014 |
| CN | 103558918 A | 2/2014 |
| CN | 103576862 A | 2/2014 |
| CN | 103576902 A | 2/2014 |
| CN | 103760983 | 4/2014 |
| CN | 103870220 A | 6/2014 |
| CN | 103885584 A | 6/2014 |
| CN | 104023128 A | 9/2014 |
| CN | 104065882 | 9/2014 |
| CN | 104394312 | 3/2015 |
| CN | 105327505 A * | 2/2016 |
| EP | 1119176 A2 | 7/2001 |
| JP | 5-104480 A | 4/1993 |
| JP | 2000-138858 A | 5/2000 |
| JP | 2007-183901 A | 7/2007 |
| KR | 10-2012-0003571 | 1/2012 |
| RU | 2242043 C2 | 12/2004 |
| RU | 2518987 C2 | 6/2014 |

OTHER PUBLICATIONS

English version of International Search Report of PCT/CN2015/075162, mailed from the State Intellectual Property Office of China dated Jul. 30, 2015.

Extended European Search Report of European Patent Application No. 15182614.6, from the European Patent Office, dated Mar. 15, 2016.

Decision on Grant Patent for Invention for Russian Application No. 2015125468/07(039618), mailed from the Russian Federal Service for Intellectual Property dated Nov. 3, 2016.

* cited by examiner

PHOTOGRAPHING CONTROL METHODS AND DEVICES

CROSS-REFERENCE TO RELATED APPLICATIONS

The present application is a continuation of International Application No. PCT/CN2015/075162, filed Mar. 26, 2015, which is based upon and claims priority to Chinese Patent Application No. 201410571904.X, filed Oct. 23, 2014, the entire contents of all of which are incorporated herein by reference.

TECHNICAL FIELD

The present disclosure generally relates to the field of smart mobile terminal technologies and, more particularly, to photographing control methods and devices.

BACKGROUND

With the improvement of photographing technologies in mobile terminals, such as smart phones and tablet computers, users are increasingly using the mobile terminals to take photos. Conventionally, to take a photo of oneself, a user needs to hold a mobile terminal with one hand and press the shooting button with the other hand. Moreover, for the mobile terminal with a large screen and a heavy weight, e.g., a tablet computer, the user may have to hold the mobile terminal with both hands, and thus is unable to press the shooting button.

SUMMARY

According to a first aspect of the present disclosure, there is provided a photographing control method for use in a mobile terminal, comprising: detecting whether the mobile terminal is in a photographing mode; sending an action-collecting instruction to a wearable device if the mobile terminal is in the photographing mode, for the wearable device to collect a motion trajectory of the wearable device according to the action-collecting instruction; receiving the motion trajectory collected by the wearable device; judging whether the received motion trajectory is a preset motion trajectory; and triggering the mobile terminal to take a photo if the received motion trajectory is the preset motion trajectory.

According to a second aspect of the present disclosure, there is provided a photographing control method for use in a wearable device, comprising: receiving an action-collecting instruction sent by a mobile terminal, the action-collecting instruction being generated by the mobile terminal when the mobile terminal is detected to be in a photographing mode; collecting a motion trajectory of the wearable device according to the action-collecting instruction; and sending the motion trajectory to the mobile terminal, to trigger the mobile terminal to take a photo if the mobile terminal judges that the motion trajectory is a preset motion trajectory.

According to a third aspect of the present disclosure, there is provided a mobile terminal, comprising: a processor; and a memory for storing instructions executable by the processor; wherein the processor is configured to: detect whether the mobile terminal is in a photographing mode; send an action-collecting instruction to a wearable device if the mobile terminal is in the photographing mode, for the wearable device to collect a motion trajectory of the wearable device according to the action-collecting instruction; receive the motion trajectory collected by the wearable device; judge whether the received motion trajectory is a preset motion trajectory; and trigger the mobile terminal to take a photo if the received motion trajectory is the preset motion trajectory.

According to a fourth aspect of the present disclosure, there is provided a wearable device, comprising: a processor; and a memory for storing instructions executable by the processor; wherein the processor is configured to: receive an action-collecting instruction sent by a mobile terminal, the action-collecting instruction being generated by the mobile terminal when the mobile terminal is detected to be in a photographing mode; collect a motion trajectory of the wearable device according to the action-collecting instruction; and send the motion trajectory to the mobile terminal, to trigger the mobile terminal to take a photo if the mobile terminal judges that the motion trajectory is a preset motion trajectory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
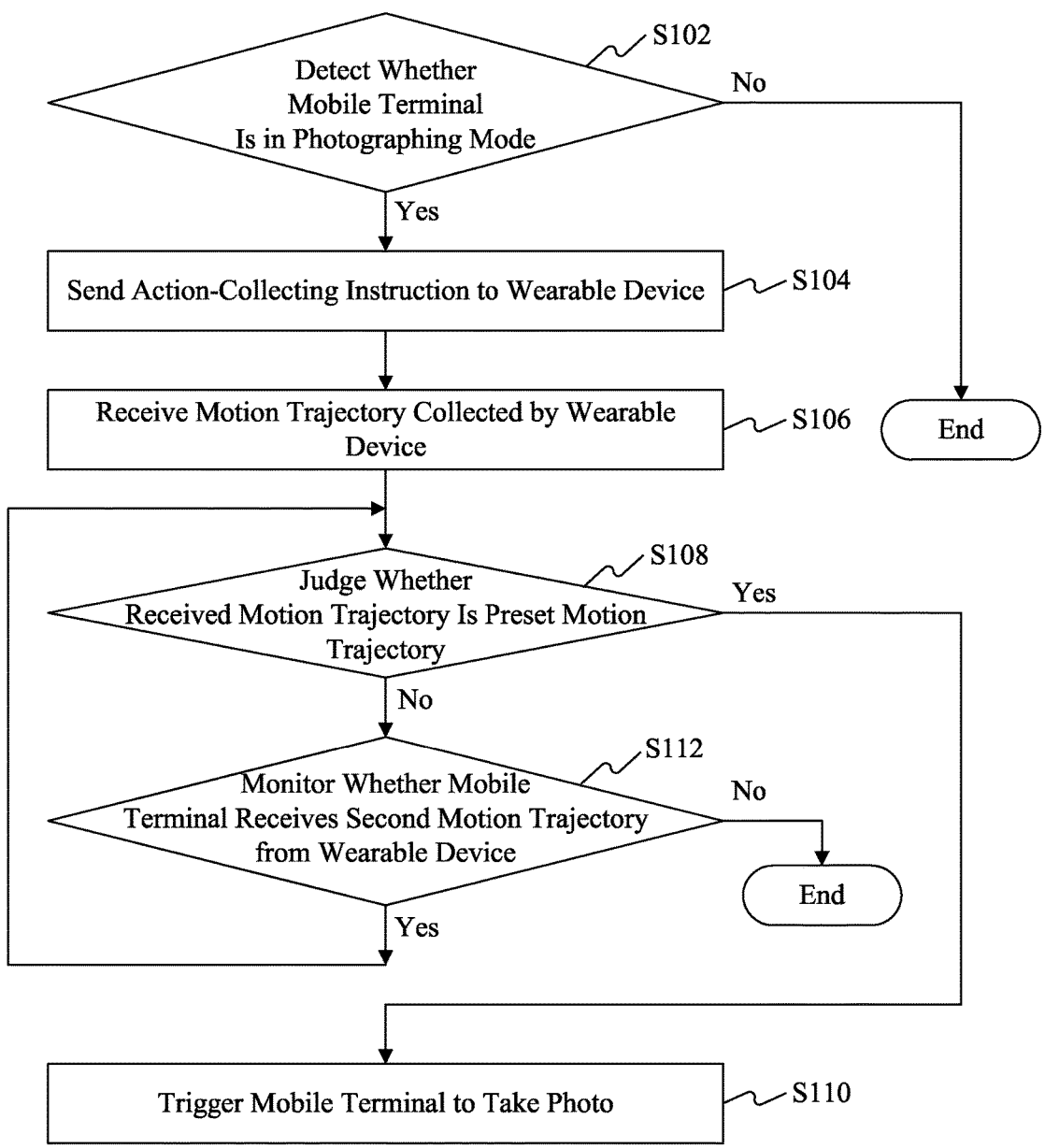
FIG. 1 is a flowchart of a photographing control method, according to an exemplary embodiment.

FIG. 1 is a flowchart of a photographing control method 100, according to an exemplary embodiment. For example, the method 100 may be applied in a mobile terminal, such as a smart phone, a tablet computer, etc. Referring to FIG. 1, the method 100 may include the following steps.

In step S102, the mobile terminal detects whether the mobile terminal is in a photographing mode.

In exemplary embodiments, the mobile terminal may detect that the photographing mode is entered when detecting a camera application on the mobile terminal is running or a screen of the mobile terminal is used by the camera application.

In step S104, the mobile terminal sends an action-collecting instruction to a wearable device when detecting the mobile terminal is in the photographing mode. The action-collecting instruction may be configured to enable the wearable device to collect a motion trajectory of the wearable device.

The wearable device may be a smart wristband, a pair of smart glasses, a smart watch, etc. The wearable device may be worn by the user of the mobile terminal. After receiving the action-collecting instruction, the wearable device begins detecting the motion trajectory according to the action-collecting instruction. The motion trajectory reflects the action of the user.

In step S106, the mobile terminal receives the motion trajectory collected by the wearable device.

In step S108, the mobile terminal judges whether the received motion trajectory is a preset motion trajectory. If the motion trajectory is a preset motion trajectory, step S110 is performed. Otherwise, step S112 is performed.

In exemplary embodiments, the mobile terminal may establish the preset motion trajectory via the wearable device in the following steps. In step 1), the mobile terminal receives a user operation for setting a preset motion trajectory and generates an action-setting instruction according to the user operation. In step 2), the mobile terminal sends the action-setting instruction to the wearable device so that the wearable device collects a current motion trajectory. In step 3), the mobile terminal receives the current motion trajectory and sets the current motion trajectory as a preset motion trajectory.

For example, the mobile terminal may be a smart phone and the wearable device may be a smart wristband. The user may trigger an application on the smart phone for setting a preset motion trajectory. The application generates a corresponding action-setting instruction and sends the action setting instruction to the smart wristband. The smart wristband collects its current motion trajectory and sends the current motion trajectory to the smart phone, which stores the current motion trajectory and sets the current motion trajectory as a preset motion trajectory. In one exemplary embodiment, the smart phone may require the user to accomplish the same motion trajectory multiple times, such as twice. Only when judging that both accomplished motion trajectories are substantially the same, the mobile terminal may set the motion trajectory as a motion trajectory.

In step S110, the mobile terminal triggers the camera application to take a photo when judging that the received motion trajectory is the preset motion trajectory.

In one exemplary embodiment, if the mobile terminal detects that at least two motion trajectories received within a preset time period are the same preset motion trajectory, the mobile terminal may trigger the camera application to take multiple photos in succession, i.e., to take photos in a burst mode. The number of the detected motion trajectories and the preset time period may be chosen freely by the user. For example, the user may preset the mobile terminal to trigger the burst mode if the mobile terminal detects two motion trajectories received in 1 minute are the same preset motion trajectory.

In another embodiment, the mobile terminal may store a first preset motion trajectory and a second preset motion trajectory. The first preset motion trajectory may be configured to trigger the mobile terminal to take a single photo, while the second preset motion trajectory may be configured to trigger the mobile terminal to take multiple photos in succession in a burst mode.

In step S112, the mobile terminal monitors whether a second motion trajectory sent by the wearable device is received. If yes, the mobile terminal returns to execute step S108. The mobile terminal may repeat steps 112 and 108 until judging that a received motion trajectory is a preset motion trajectory.

The method 100 detects the user's action via the wearable device and instructs the mobile terminal to take a photo accordingly. This way, the user may control the mobile terminal to take a photo without physically touching a shooting button on the mobile terminal. Therefore, the method 100 simplifies the photographing operation and is convenient to use.

Figure 2:
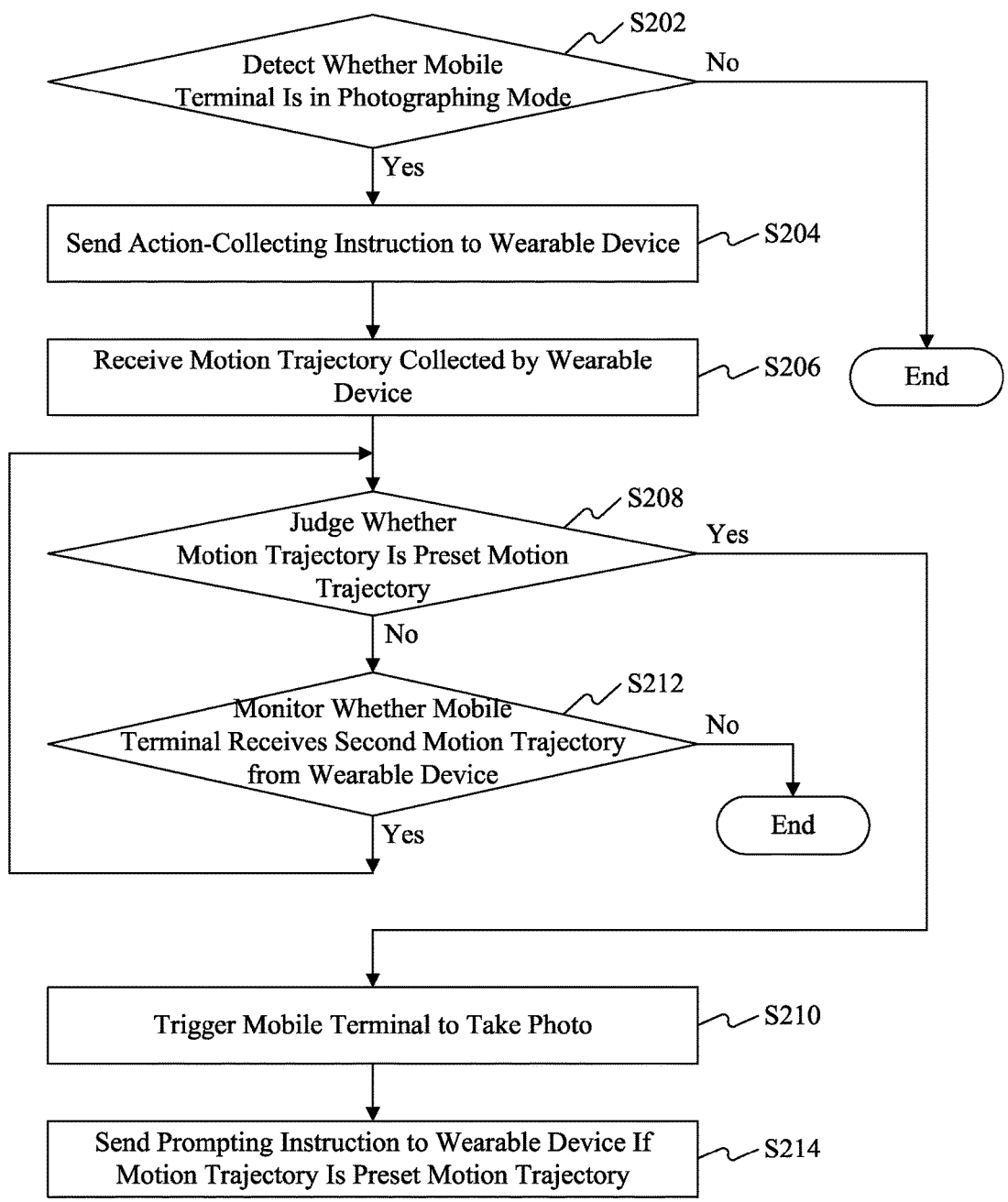
FIG. 2 is a flowchart of a photographing control method, according to an exemplary embodiment.

FIG. 2 is a flowchart of a photographing control method 200, according to an exemplary embodiment. The method 200 may be applied in a mobile terminal. Referring to FIG. 2, the method 200 may include step S214, in addition to steps S202-S212, which are similar to steps S102-S112 in the method 100 (FIG. 1), respectively.

In step S214, the mobile terminal sends a prompting instruction to the wearable device. The prompting instruction may be configured to instruct the wearable device to prompt the user that the mobile terminal successfully triggers the photographing. In exemplary embodiments, step S214 may be performed before, after, or simultaneously with step 210.

In exemplary embodiments, the prompt may be a vibration or a ring by the wearable device. For example, the mobile terminal may be a smart phone and the wearable device may be a wristband. The wristband may vibrate after receiving the prompting instruction from the smart phone. Feeling the vibration of the smart wristband, the user learns that the smart phone successfully triggers the photographing.

The method 200 may prevent the user from continuing doing the actions associated with the preset motion trajectories. This way, the wearable device needs not to continue collecting the motion trajectories and the mobile terminal needs not to continue processing the motion trajectories collected by the wearable device. Therefore, the methods 200 may save the processor resources and electric power in the mobile terminal and the wearable device.

Figure 3:
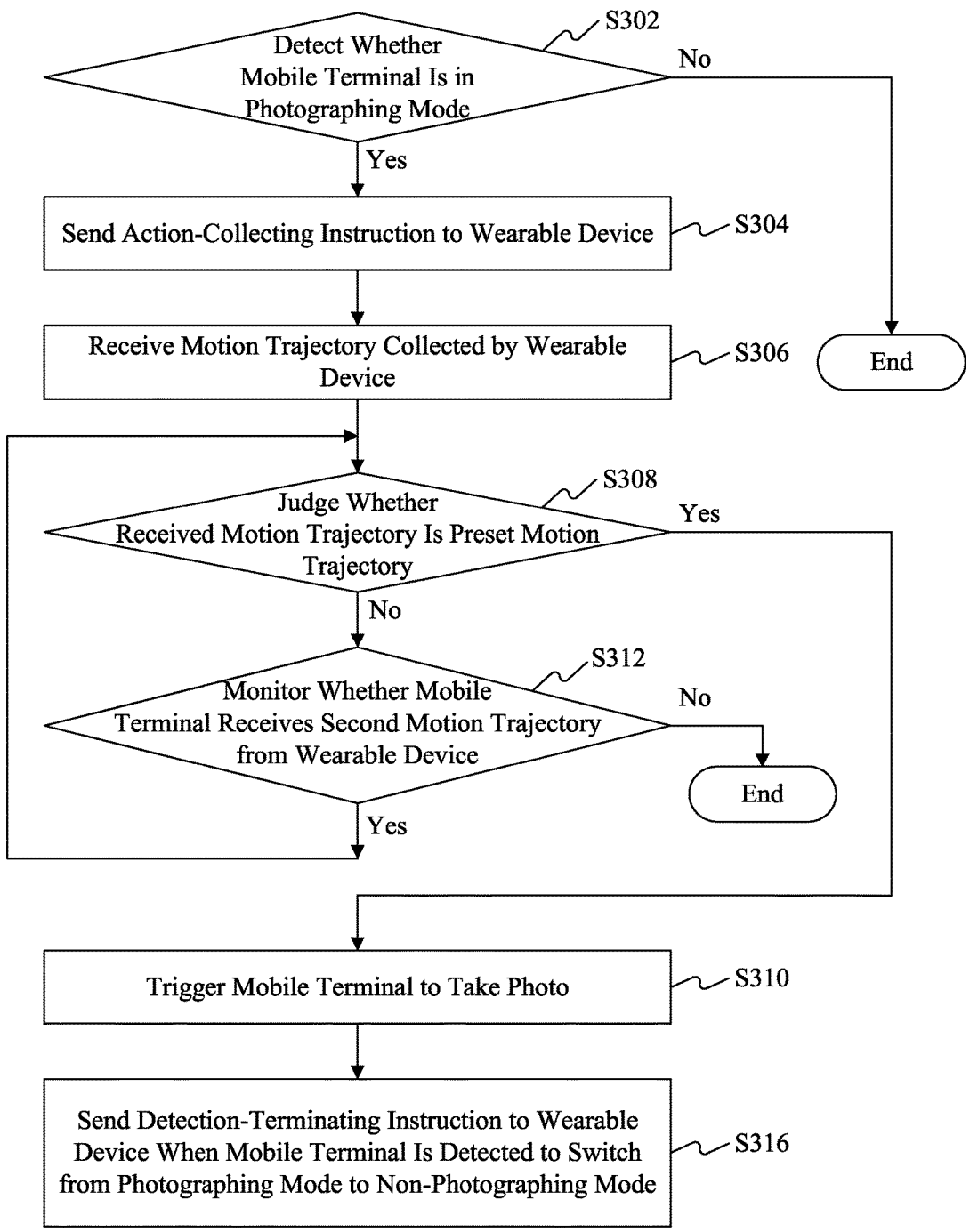
FIG. 3 is a flowchart of a photographing control method, according to an exemplary embodiment.

FIG. 3 is a flowchart of a photographing control method 300, according to an exemplary embodiment. The method may be applied in a mobile terminal. Referring to FIG. 3, the method 300 may include step S316, in addition to steps S302-S312, which are similar to steps S102-S112 in the method 100 (FIG. 1), respectively.

In step S316, when detected to switch from the photographing mode to a non-photographing mode, the mobile terminal sends a detection-terminating instruction to the wearable device. The detection-terminating instruction may be configured to instruct the wearable device to stop sending motion trajectories to the mobile terminal.

In exemplary embodiments, the mobile terminal detects whether it is switched from the photographing mode to the non-photographing mode. If yes, the mobile terminal sends the detection-terminating instruction to the wearable device so that the wearable device stops collecting or sending motion trajectories according to the instruction. Otherwise, the mobile terminal detects its mode again after a preset time interval, e.g., 40 seconds.

Similar to the method 200, the method 300 may prevent the wearable device from continuing collecting the motion trajectories or the mobile terminal from continuing processing the motion trajectories collected by the wearable device. Therefore, the method 300 also saves the processor resources and electric power in the mobile terminal and the wearable device.

Figure 4:
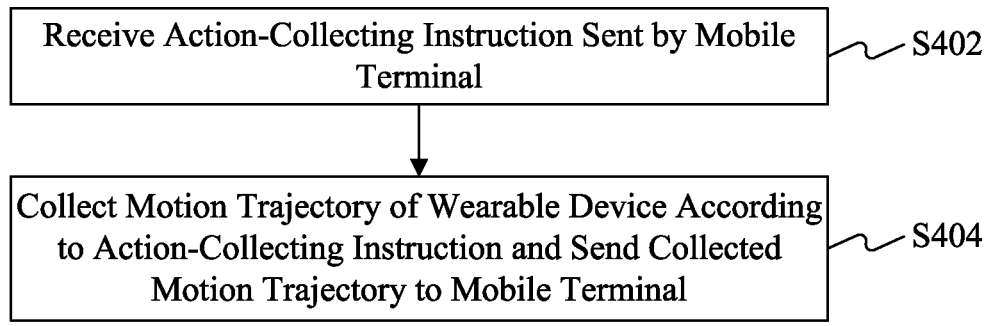
FIG. 4 is a flowchart of a photographing control method, according to an exemplary embodiment.

FIG. 4 is a flowchart of a photographing control method 400, according to an exemplary embodiment. The method may be applied in a wearable device, such as a smart wristband, a pair of smart glasses, a smart watch, etc. Referring to FIG. 4, the method 400 may include the following steps.

In step S402, the wearable device receives an action-collecting instruction sent by a mobile terminal. The mobile terminal may be a smart phone, a tablet computer, and the like. The mobile terminal generates the action-collecting instruction when detecting that the mobile terminal is in a photographing mode.

In step S404, the wearable device collects its motion trajectory according to the action-collecting instruction and sends the motion trajectory to the mobile terminal. The mobile terminal triggers photographing if judging that the motion trajectory is a preset motion trajectory.

For example, a smart wristband may start collecting its motion trajectory, corresponding to the actions of the user wearing the smart wristband, after receiving an action-collecting instruction sent by a smart phone. The smart wristband sends the collected motion trajectory to the smart phone, which judges whether the collected motion trajectory is a preset motion trajectory. If the collected motion trajectory is a preset motion trajectory, the smart phone triggers a camera application to take a photo.

In exemplary embodiments, a preset motion trajectory may be set according to the following steps. In step 1), the wearable device receives an action-setting instruction from the mobile terminal. The mobile terminal generates the action-setting instruction when detecting a user operation for setting a preset motion trajectory. In step 2), the wearable device collects its current motion trajectory according to the action-setting instruction. In step 3), the wearable device further sends the current motion trajectory to the mobile terminal so that the mobile terminal sets the current motion trajectory as a preset motion trajectory.

Figure 5:
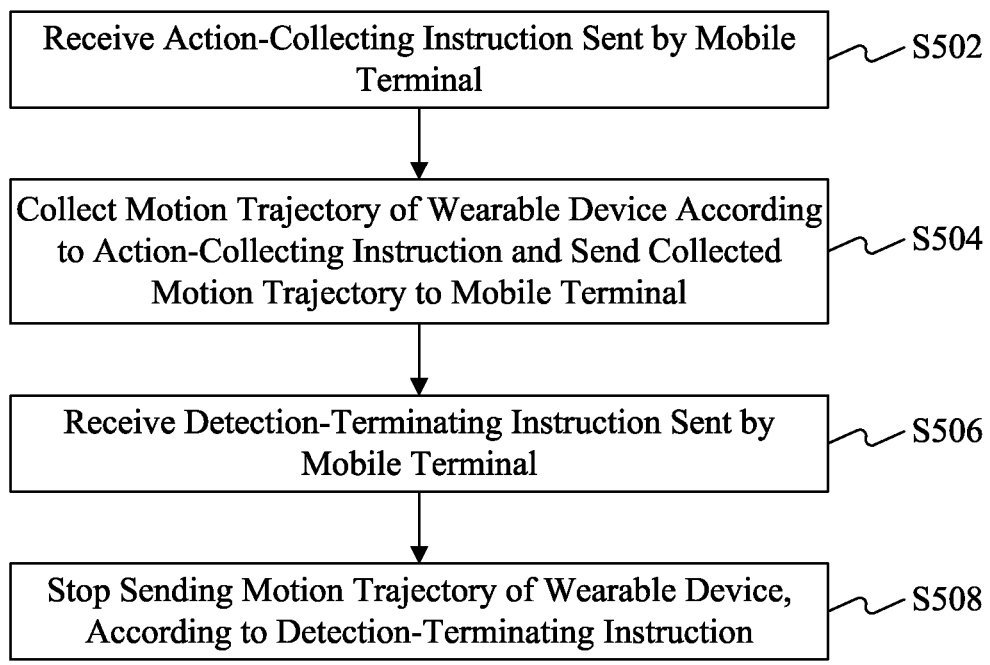
FIG. 5 is a flowchart of a photographing control method, according to an exemplary embodiment.

FIG. 5 is a flowchart of a photographing control method 500, according to an exemplary embodiment. The method 500 may be applied to a wearable device. Referring to FIG. 5, the method 500 may include steps S506 and S508, in addition to steps S502 and S504, which are similar to steps S402 and S404 in the method 400 (FIG. 4), respectively.

In step S506, the wearable device receives a detection-terminating instruction sent by the mobile terminal. The mobile terminal generates the detection-terminating instruction when detecting that a camera application on the mobile terminal is switched from a photographing mode to a non-photographing mode.

In step S508, the wearable device stops collecting motion trajectories or sending motion trajectories to the mobile terminal, according to the detection-terminating instruction.

In one exemplary embodiment, the wearable device may start to countdown the time after receiving an action-collecting instruction for collecting a motion trajectory. If the wearable device does not receive a detection-terminating instruction within a preset time period, the wearable device may automatically stop collecting the motion trajectory.

Figure 6:
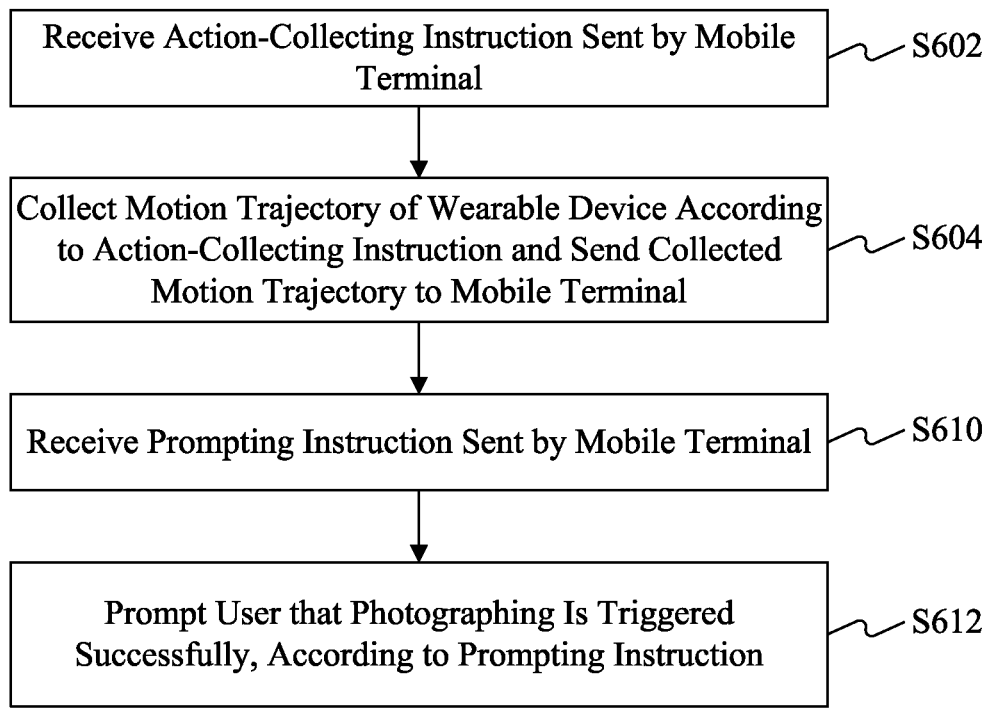
FIG. 6 is a flowchart of a photographing control method, according to an exemplary embodiment.

FIG. 6 is a flowchart of a photographing control method 600, according to an exemplary embodiment. The method 600 may be applied in a wearable device. Referring to FIG. 6, the method 600 may include steps S610 and S612, in addition to the steps S602 and S604, which are similar to steps S402 and S404 in the method 400 (FIG. 4), respectively.

In step S610, the wearable device receives a prompting instruction sent by the mobile terminal. The mobile terminal generates the prompting instruction when judging that a motion trajectory collected by the smart wearable device is a preset motion trajectory.

In step S620, the wearable device prompts the user that the mobile terminal successfully triggers the photographing according to the prompting instruction.

For example, a smart wristband may vibrate after receiving a prompting instruction from a smart phone. Feeling the vibration of the smart wristband, the user wearing the smart wristband learns that the mobile phone is successfully triggered to take photos.

Figure 7:
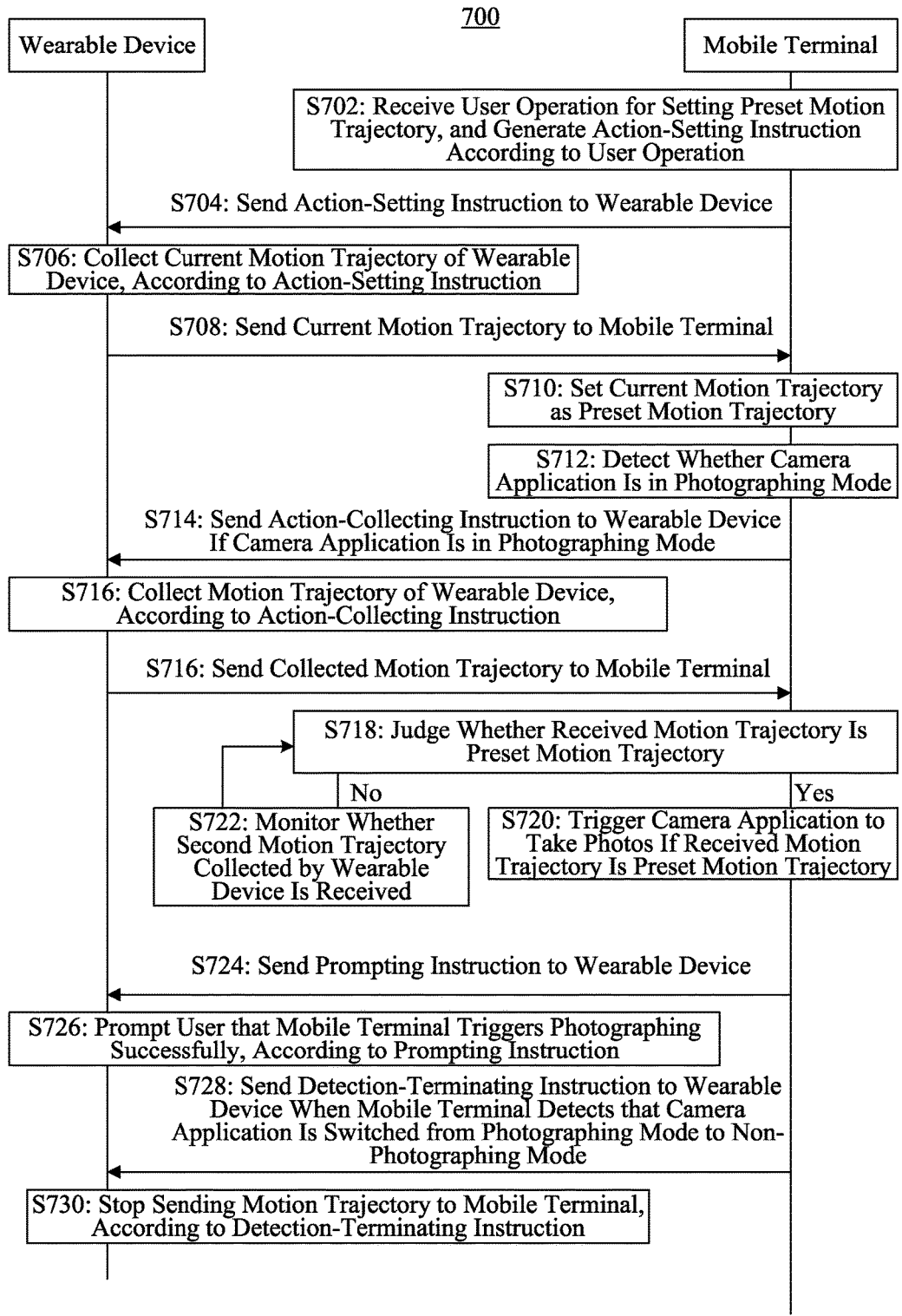
FIG. 7 is a flowchart of a photographing control method, according to an exemplary embodiment.

FIG. 7 is a flowchart of a photographing control method 700, according to an exemplary embodiment. The method 700 may be applied to a system including a mobile terminal and a wearable device. Referring to FIG. 7, the method 700 includes following steps.

In step S702, the mobile terminal receives a user operation for setting a preset motion trajectory, and generates an action-setting instruction according to the operation.

In step S704, the mobile terminal sends the action-setting instruction to the wearable device.

In step S706, the wearable device collects its current motion trajectory according to the action-setting instruction.

In step S708, the wearable device sends the current motion trajectory to the mobile terminal.

In step S710, the mobile terminal sets the current motion trajectory as a preset motion trajectory.

In step S712, the mobile terminal detects whether a camera application on the mobile terminal is in a photographing mode.

In step S714, the mobile terminal sends an action-collecting instruction to the wearable device if the camera application is in a photographing mode.

In step S716, the wearable device collects its motion trajectory according to the action-collecting instruction and sends the collected motion trajectory to the mobile terminal.

In step S718, the mobile terminal judges whether the received motion trajectory is a preset motion trajectory. The mobile terminal proceeds to step S720 if the received motion trajectory received is a preset motion trajectory. Otherwise, the mobile terminal proceeds to step S722.

In step S720, the mobile terminal triggers the camera application to take a photo if the received motion trajectory is a preset motion trajectory. Afterwards, the mobile terminal proceeds to step S724.

In step S722, the mobile terminal monitors whether a second motion trajectory collected by the wearable device is received. If receiving the second motion trajectory, the mobile terminal returns to perform step S718.

In step S724, the mobile terminal sends a prompting instruction to the wearable device after triggering the photographing successfully.

In step S726, the wearable device prompts the user that the mobile terminal successfully triggers the photographing, according to the prompting instruction.

In step S728, when detecting the camera application is switched from the photographing mode to a non-photographing mode, the mobile terminal sends a detection-terminating instruction to the wearable device.

In step S730, the wearable device stops sending motion trajectories to the mobile terminal according to the detection-terminating instruction.

Figure 8:
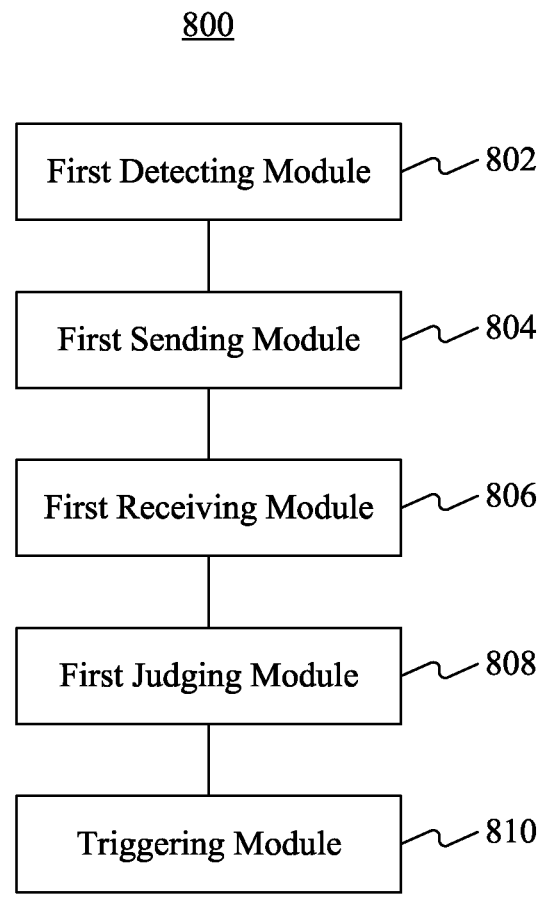
FIG. 8 is a block diagram of a photographing control device, according to an exemplary embodiment.

FIG. 8 is a block diagram of a photographing control device 800, according to an exemplary embodiment. The device 800 may be a mobile terminal, such as a smart phone, a tablet computer, etc. Referring to FIG. 8, the device 800 may include a first detecting module 802, a first sending module 804, a first receiving module 806, a first judging module 808, and a triggering module 810.

The first detecting module 802 may be configured to detect whether the mobile terminal is in a photographing mode.

The first sending module 804 may be configured to send an action-collecting instruction to the wearable device when the first detecting module 802 detects that the smart mobile terminal is at a photographing mode. The action-collecting instruction may be configured to enable the wearable device to collect its motion trajectory.

The first receiving module 806 may be configured to receive a motion trajectory collected by the wearable device.

The first judging module 808 may be configured to judge whether the motion trajectory received by the first receiving module 806 is a preset motion trajectory.

The triggering module 810 may be configured to trigger the mobile terminal to take photos if the first judging module 808 judges that the received motion trajectory is a preset motion trajectory.

In one embodiment, the triggering module 810 may further include a first triggering sub-module and a second triggering sub-module (not shown in FIG. 8). The first triggering sub-module may be configured to trigger the mobile terminal to take a single photo when only one motion trajectory received within a preset time period is a preset motion trajectory. The second triggering sub-module may be configured to take multiple photos in a burst mode when at least two motion trajectories received within the preset time period are preset motion trajectories.

In another embodiment, the mobile terminal may store a first preset motion trajectory and a second preset motion trajectory. The triggering module 810 may further include a third triggering sub-module and a fourth triggering sub-module (not shown in FIG. 8). The third triggering sub-module may be configured to trigger the mobile terminal to take a single photo when the received motion trajectory is the first preset motion trajectory. The fourth triggering sub-module may be configured to trigger the mobile terminal to take multiple photos in a burst mode when the received trajectory is the second preset motion trajectory.

Figure 9:
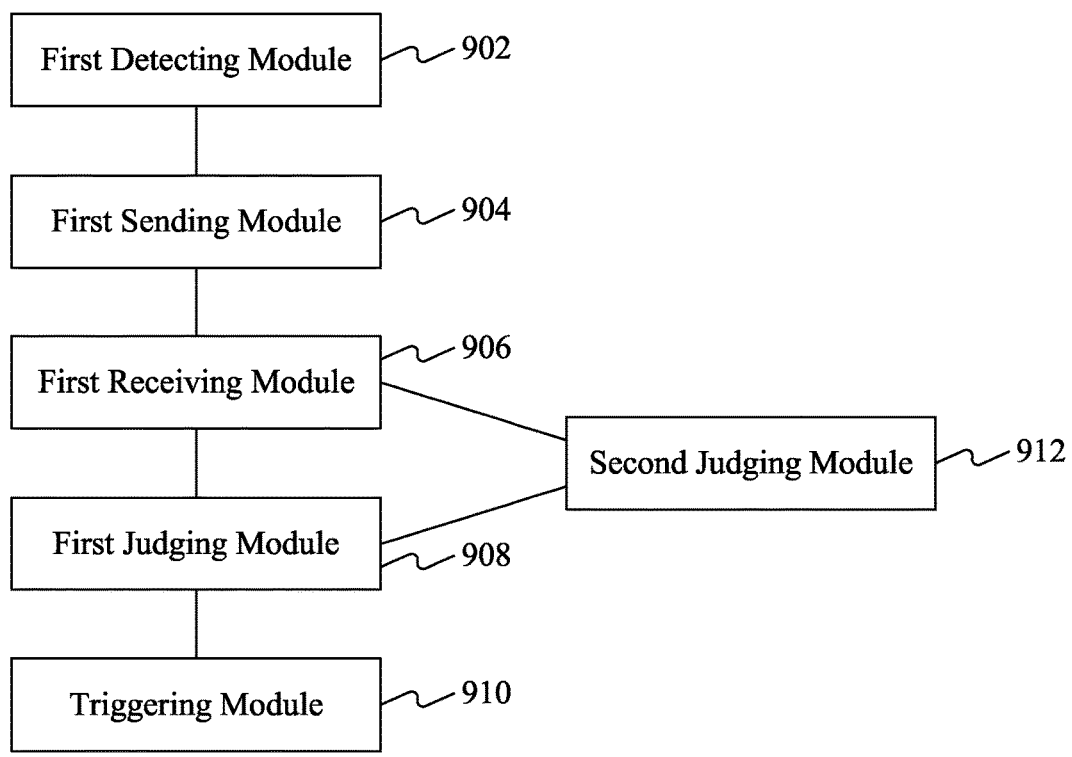
FIG. 9 is a block diagram of a photographing control device, according to an exemplary embodiment.

FIG. 9 is a block diagram of a photographing control device 900, according to an exemplary embodiment. The device 900 may be applied in a mobile terminal. Referring to FIG. 9, the device 900 may include a second judging module 912, in addition to modules 902-910, which are similar to modules 802-810 in the device 800 (FIG. 8), respectively.

The second judging module 912 may be configured to judge whether the first receiving module 906 receives a second motion trajectory from the wearable device if the first judging module 908 judges that a first motion trajectory is not a preset motion trajectory. The second judging module 912 may be further configured to enable the first judging module 908 to judge whether the second motion trajectory is a preset motion trajectory if the first receiving module 906 does receive the second motion trajectory.

Figure 10:
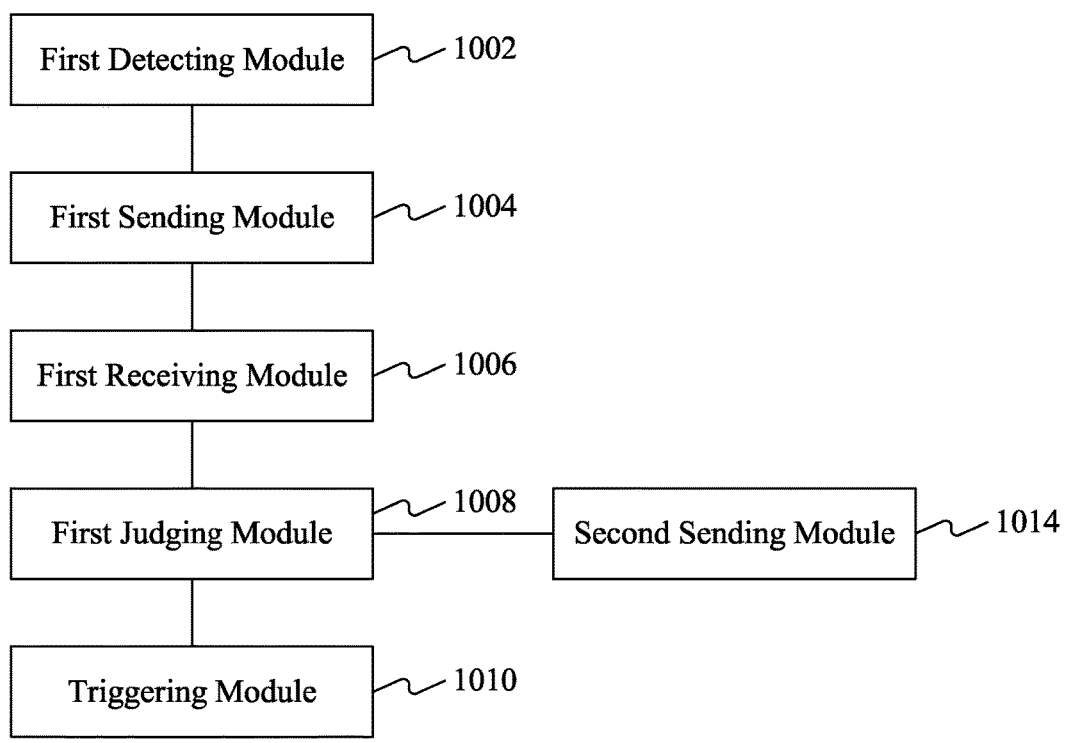
FIG. 10 is a block diagram of a photographing control device, according to an exemplary embodiment.

FIG. 10 is a block diagram of a photographing control device 1000, according to an exemplary embodiment. The device 1000 may be applied in a mobile terminal. Referring to FIG. 10, the device 1000 may include a second sending module 1014, in addition to modules 1002-1010, which are similar to modules 802-810 in the device 800 (FIG. 8), respectively.

The second sending module 1014 may be configured to send a prompting instruction to the wearable device if the first judging module 1008 judges that the received motion trajectory is a preset motion trajectory. The prompting instruction may be configured to enable the wearable device to prompt the user that the photographing is triggered successfully.

Figure 11:
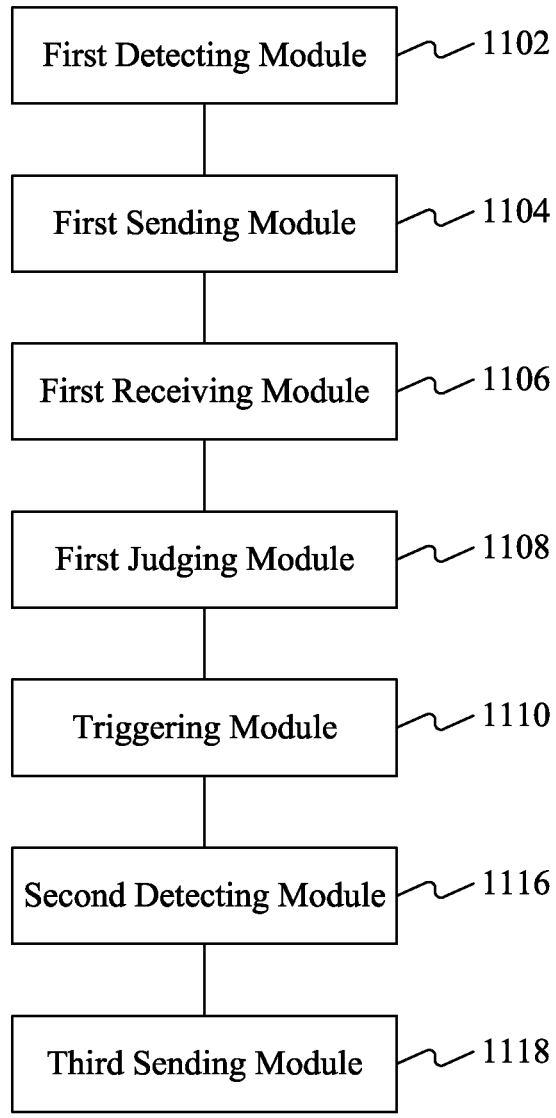
FIG. 11 is a block diagram of a photographing control device, according to an exemplary embodiment.

FIG. 11 is a block diagram of a photographing control device 1100, according to an exemplary embodiment. The device 1100 may be applied in a mobile terminal. Referring to FIG. 11, the device 1100 may include a second detecting module 1116 and a third sending module 1118, in addition to modules 1102-1110, which are similar to modules 802-810 in the device 800 (FIG. 8), respectively.

The second detecting module 1116 may be configured to detect whether the mobile terminal is switched from a photographing mode to a non-photographing mode.

The third sending module 1118 may be configured to send a detection-terminating instruction to the wearable device when the second detecting module 1116 detects that the mobile terminal is switched to a non-photographing mode. The detection-terminating instruction may be configured to instruct the wearable device to stop sending any motion trajectories to the mobile terminal.

Figure 12:
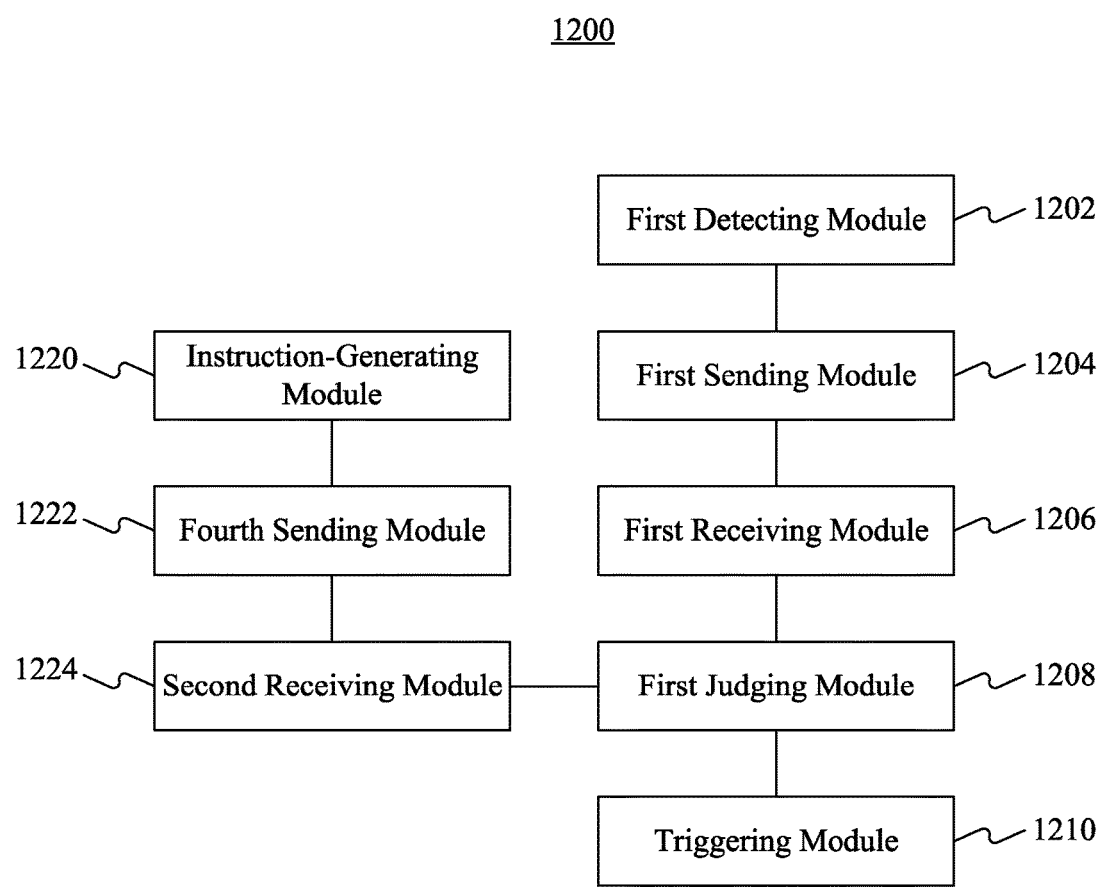
FIG. 12 is a block diagram of a photographing control device, according to an exemplary embodiment.

FIG. 12 is a block diagram of a photographing control device 1200, according to an exemplary embodiment. The device 1200 may be applied in a mobile terminal. Referring to FIG. 12, the device 1200 may include an instruction-generating module 1220, a fourth sending module 1222, and a second receiving module 1224, in addition to modules 1202-1210, which are similar to modules 802-810 in the device 800 (FIG. 8), respectively.

The instruction-generating module 1220 may be configured to receive a user operation for setting a preset motion trajectory, and to generate an action-setting instruction according to the operation.

The fourth sending module 1222 may be configured to send the action-setting instruction to the wearable device so that the wearable device detects its current motion trajectory according to the action-setting instruction.

The second receiving module 1224 may be configured to receive the current motion trajectory from the wearable device and to set the current motion trajectory as a preset motion trajectory.

Figure 13:
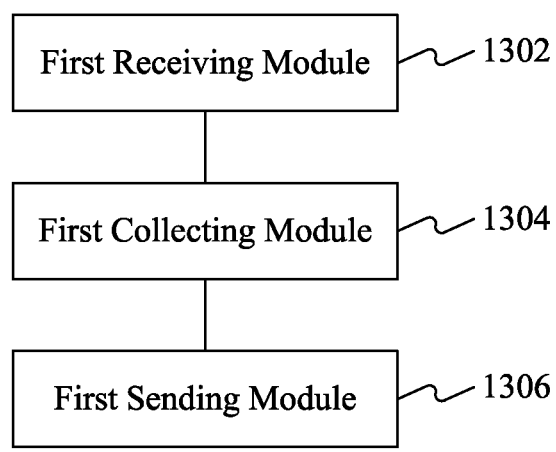
FIG. 13 is a block diagram of a photographing control device, according to an exemplary embodiment.

FIG. 13 is a block diagram of a photographing control device 1300, according to an exemplary embodiment. The device 1300 may be applied in a wearable device. Referring to FIG. 13, the device 1300 may include a first receiving module 1302, a first collecting module 1304, and a first sending module 1306.

The first receiving module 1302 may be configured to receive an action-collecting instruction sent by a smart mobile terminal. The mobile terminal may generate the action-collecting instruction when detecting the mobile terminal is in a photographing mode.

The first-collecting module 1304 may be configured to collect a motion trajectory of the wearable device, according to the action-collecting instruction received by the first receiving module 1302.

The first sending module 1306 may be configured to send the motion trajectory collected by the first collecting module 1320 to the mobile terminal so that the mobile terminal may trigger the photographing when judging that the motion trajectory is a preset motion trajectory.

Figure 14:
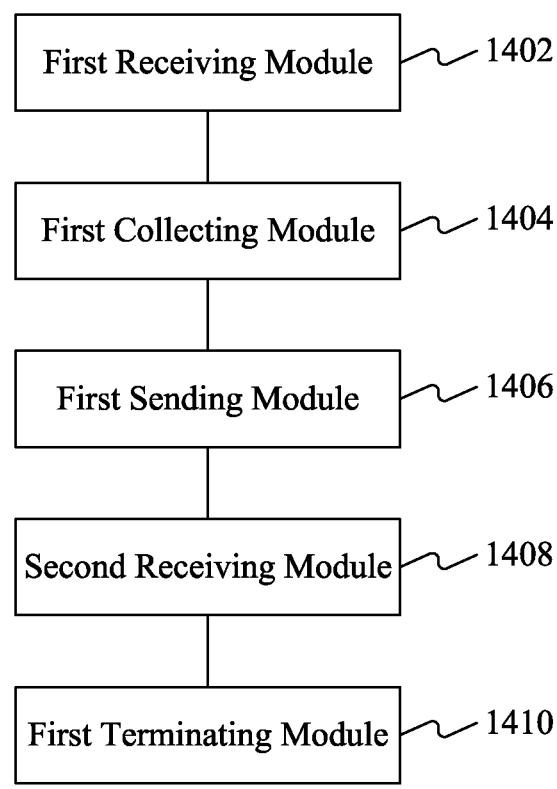
FIG. 14 is a block diagram of a photographing control device, according to an exemplary embodiment.

FIG. 14 is a block diagram of a photographing control device 1400, according to an exemplary embodiment. The device 1400 may be applied in a wearable device. Referring to FIG. 14, the device 1400 may include a second receiving module 1408 and a first terminating module 1410, in addition to the modules 1402-1406, which are similar to the modules 1302-1306 in the device 1300 (FIG. 13), respectively.

The second receiving module 1408 may be configured to receive a detection-terminating instruction sent by the mobile terminal. The mobile terminal may generate the detection-terminating instruction when detecting the mobile terminal is switched from a photographing mode to a non-photographing mode.

The first terminating module 1410 may be configured to stop the wearable device from sending any motion trajectory to the mobile terminal, according to the detection-terminating instruction received by the second receiving module 1408.

In some embodiments, the photographing control device 1400 may further include a second terminating module (not shown in FIG. 1400). The second terminating module may be configured to stop the wearable device from sending motion trajectories if the second receiving module 1408 fails to receive a detection-terminating instruction within a preset time period after the first receiving module 1402 receives an action-collecting instruction.

Figure 15:
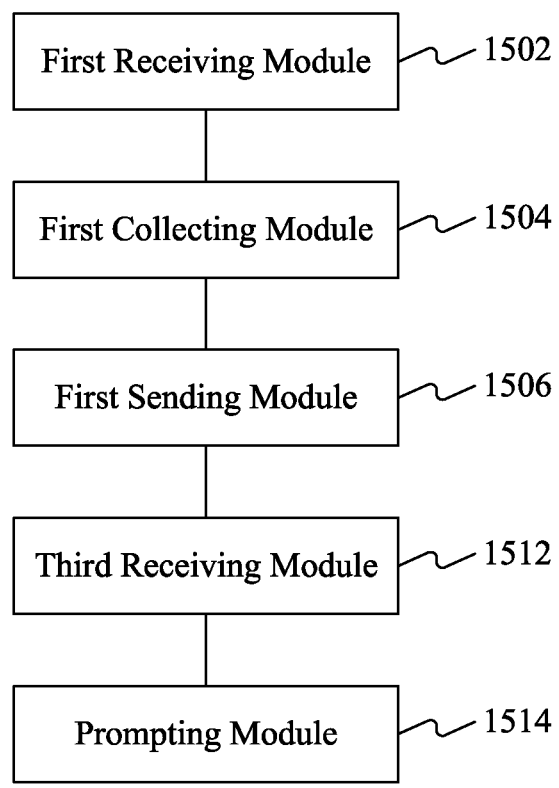
FIG. 15 is a block diagram of a photographing control device, according to an exemplary embodiment.

FIG. 15 is a block diagram of a photographing control device 1500, according to an exemplary embodiment. The device 1500 may be applied in a wearable device. Referring to FIG. 15, the device 1500 may include a third receiving module 1512 and a prompting module 1514, in addition to the modules 1502-1506, which are similar to the modules 1302-1306 in the device 1300 (FIG. 13), respectively.

The third receiving module 1512 may be configured to receive a prompting instruction sent by the mobile terminal. The mobile terminal may generate the prompting instruction when judging that a motion trajectory is a preset motion trajectory.

The prompting module 1514 may be configured to prompt the user that the mobile terminal has successfully triggered the photographing, according to the prompting instruction received by the third receiving module 1512.

Figure 16:
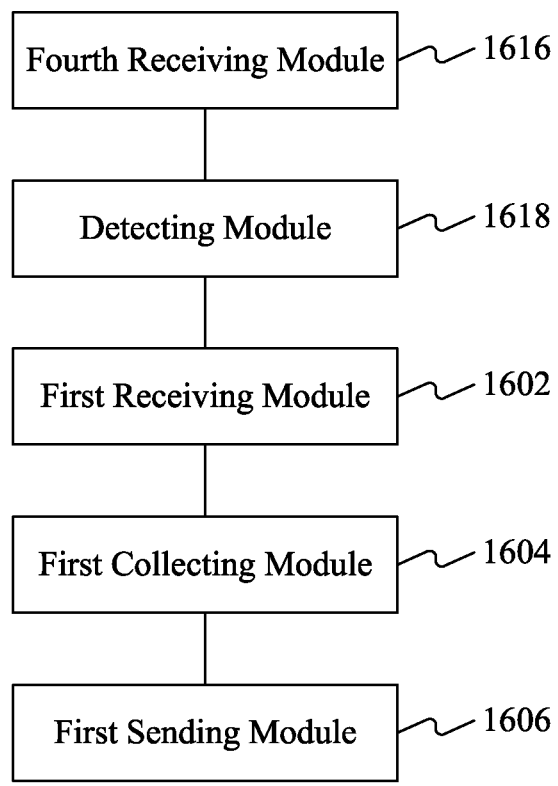
FIG. 16 is a block diagram of a photographing control device, according to an exemplary embodiment.

FIG. 16 is a block diagram of a photographing control device 1600, according to an exemplary embodiment. The device 1600 may be applied in a wearable device. Referring to FIG. 16, the device 1600 may include a fourth receiving module 1616 and a detecting module 1618, in addition to the modules 1602-1606, which are similar to the modules 1302-1306 in the device 1300 (FIG. 13), respectively.

The fourth receiving module 1616 may be configured to receive an action-setting instruction sent by the mobile terminal. The mobile terminal may generate the action-setting instruction when detecting a user operation for setting an action.

The detection module 1618 may be configured to detect the current motion trajectory of the wearable device according to the action-setting instruction, and to send the current motion trajectory to the mobile terminal so that the mobile terminal sets the current motion trajectory as a preset motion trajectory.

Figure 17:
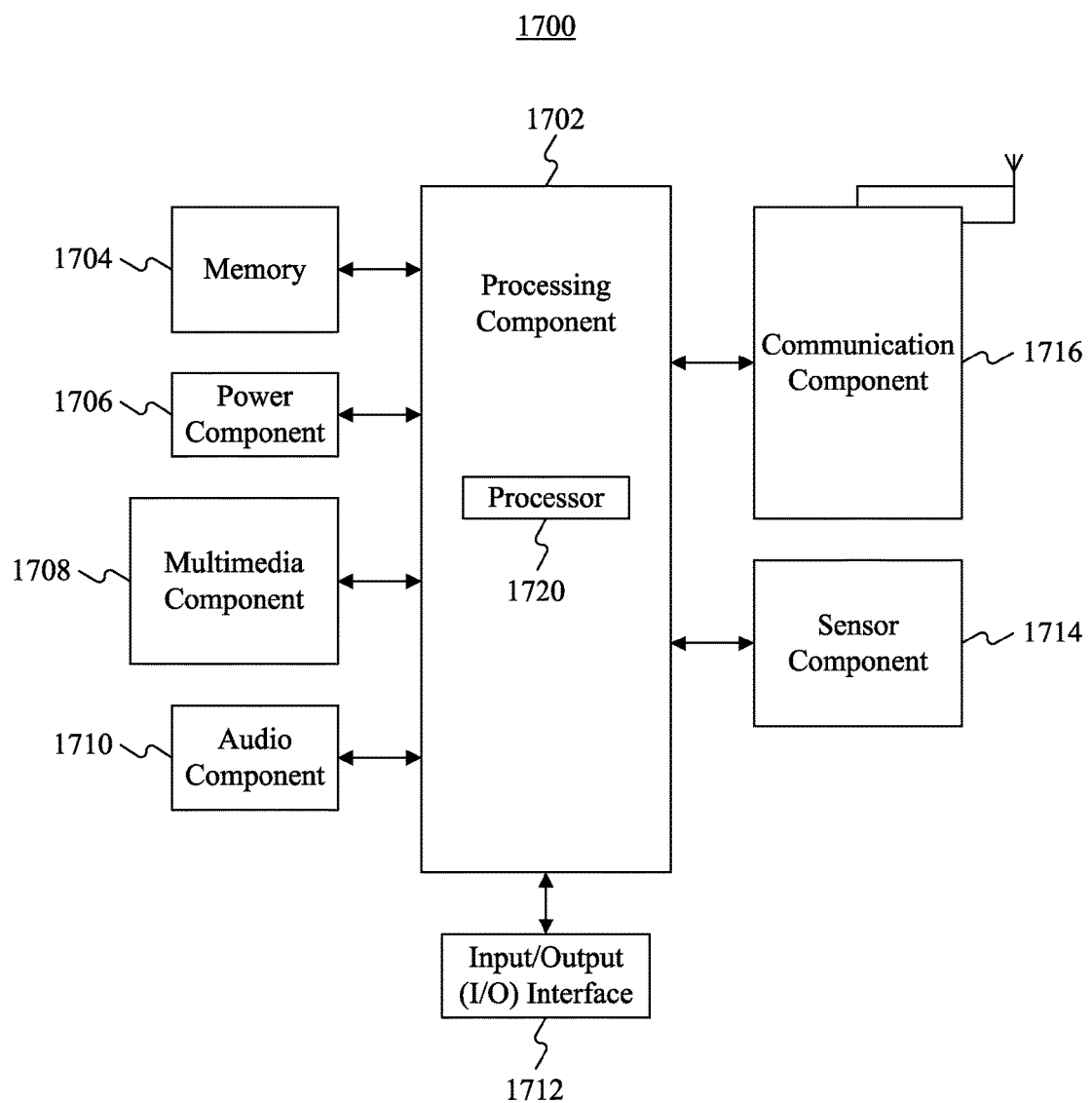
FIG. 17 is a block diagram of a photographing control device, according to an exemplary embodiment.

FIG. 17 is a block diagram of a photographing control device 1700, according to an exemplary embodiment. The device 1700 may be a mobile terminal, such as a smart phone, a tablet computer, a digital broadcasting terminal, a message transceiver, a game controller, a medical device, fitness equipment, a personal digital assistant (PDA), and the like. The device 1700 may also be a wearable device, such as a smart wristband, a pair of smart glasses, a smart watch, and the like.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 usually controls the overall operation of the device 1700, such as the operations associated with display, telephone calls, data communications, camera operations, and recording operations. The processing component 1702 may include one or more processors 1720 for executing instructions to perform all or part of the steps in the above described methods. In addition, the processing component 1702 may include one or more modules which facilitate the interaction between the processing component 1702 and other components. For example, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures and video, etc. The memory 1704 may be implemented using any type of volatile or non-volatile memory devices, or combination thereof, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or optical disk.

The power supply component 1706 provides power for components of the device 1700. The power component 1706 provides power to various components of the device 1700. The power component 1706 may include a power management system, one or more power sources, and other components associated with the power generation, management, and distribution of power in the device 1700.

The multimedia component 1708 includes a screen providing an output interface between the device 1700 and a user. In some embodiments, the screen may include a liquid crystal display (LCD) and a touch panel (TP). If the screen includes the touch panel, the screen may be implemented as a touch screen for receiving input signals from the user. The touch panel includes one or more touch sensors for sensing gestures on the touch panel, e.g., touches, swipes, etc. The touch sensor not only may sense a boundary of a touch or swipe operation, but also may sense a time period and a pressure associated with the touch or swipe operation. In some embodiments, the multimedia component 1708 includes a front-facing camera and/or a rear-facing camera. The front-facing camera and/or the rear-facing camera may receive external multimedia data while the device 1700 is in an operation mode, such as a photographing mode and a video mode. Each of the front-facing camera and the rear-facing camera may be a fixed optical lens system or have focus and optical zoom capacity.

The audio component 1710 is configured to output and/or input audio signals. For example, the audio component 1710 includes a microphone (MIC) configured to receive an external audio signal when the device 1700 is in an operation mode, such as a calling mode, a recording mode, and a voice recognition mode. The received audio signal may be further stored in the memory 1704 or transmitted via the communication component 1716. In some embodiments, the audio component 1710 also includes a loudspeaker for outputting audio signals.

The I/O interface 1712 provides an interface between the processing component 1702 and peripheral interface modules, such as a keyboard, a click wheel, buttons, etc. The buttons may include, but are not limited to, a home button, a volume button, a starting button, and a locking button.

The sensor component 1714 includes one or more sensors for providing the device 1700 with status assessments in various aspects. For example, the sensor component 1714 may detect an on/off status of the device 1700, relative positioning of components, e.g., the display and keypad, of the device 1700, a position change of the device 1700 or a component of the device 1700, a presence or absence of user contact with the device 1700, the orientation or an acceleration/deceleration of the device 1700, and a temperature variation of the device 1700. The sensor component 1714 may include a proximity detector configured to detect the presence of nearby objects without any physical contacts. The sensor component 1714 may also include an optical sensor, such as CMOS or CCD image sensors, for use in imaging applications. In some embodiments, the sensor component 1714 may also include an acceleration sensor, a gyroscope sensor, a magnetic sensor, a pressure sensor, or a temperature sensor.

The communication component 1716 is configured to facilitate wired or wireless communications between the device 1700 and other devices. The device 1700 may access a wireless network based on a communication standard, such as WiFi, 2G, 3G, or a combination thereof. In one exemplary embodiment, the communication component 1716 receives a broadcast signal or broadcast-related information from an external broadcast management system via a broadcast channel. In another exemplary embodiment, the communication component 1716 further includes a near-field communication (NFC) module for facilitating short-range communications. For example, the NFC module may be implemented based on a radio frequency identification (RFID) Technology, an infrared data association (IrDA) technology, an ultra-wide bandwidth (UWB) technology, a bluetooth (BT) technology, and other technologies.

In exemplary embodiments, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components configured to perform the above described methods.

In exemplary embodiments, there is also provided a non-transitory computer-readable storage medium, such as the memory 1704, executable by the processor 1720 for performing the above described methods. For example, the non-transitory computer-readable storage medium may be a ROM, a random access memory (RAM), a CD-ROM, a magnetic tape, a floppy disk, an optical data storage device, etc.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A photographing control method for use in a mobile terminal, comprising:
    detecting whether the mobile terminal is in a photographing mode;
    sending an action-collecting instruction to a wearable device if the mobile terminal is in the photographing mode, the action-collecting instruction causing the wearable device to collect a motion trajectory of the wearable device;
    receiving the motion trajectory collected by the wearable device;
    judging whether the received motion trajectory is a preset motion trajectory;
    triggering the mobile terminal to take a photo if the received motion trajectory is the preset motion trajectory;
    detecting that the mobile terminal is switched from the photographing mode to a non-photographing mode; and
    sending a detection-terminating instruction to the wearable device, instructing the wearable device to stop sending a motion trajectory.

2. The method of claim 1, wherein the received motion trajectory is a first motion trajectory, the method further comprising:
    monitoring whether the mobile terminal receives a second motion trajectory collected by the wearable device if the first motion trajectory is not the preset motion trajectory; and judging whether the second motion trajectory is the preset motion trajectory if the wearable device receives the second motion trajectory.

3. The method of claim 1, further comprising:
sending a prompting instruction to the wearable device if the received motion trajectory is the preset motion trajectory, the prompting instruction being configured to instruct the wearable device to prompt a user that the photographing is triggered successfully.

4. The method of claim 1, wherein the triggering of the mobile terminal to take a photo if the received motion trajectory is the preset motion trajectory comprises at least one of:
triggering the mobile terminal to take a single photo when only one motion trajectory received within a preset time period is a first preset motion trajectory; and triggering the mobile terminal to take multiple photos in succession when at least two motion trajectories received within the preset time period are the first preset motion trajectory; or
triggering the mobile terminal to take a single photo when the received motion trajectory is a second preset motion trajectory; and triggering the mobile terminal to take multiple photos in succession when the received motion trajectory is a third preset motion trajectory.

5. The method of claim 1, further comprising:
receiving a user operation for setting the preset motion trajectory;
generating an action-setting instruction according to the user operation;
sending the action-setting instruction to the wearable device, for the wearable device to collect a current motion trajectory of the wearable device according to the action-setting instruction;
receiving the current motion trajectory collected by the wearable device; and
setting the current motion trajectory as the preset motion trajectory.

6. A mobile terminal, comprising:
a processor; and
a memory for storing instructions executable by the processor;
wherein the processor is configured to:
detect whether the mobile terminal is in a photographing mode;
send an action-collecting instruction to a wearable device if the mobile terminal is in the photographing mode, the action-collecting instruction causing the wearable device to collect a motion trajectory of the wearable device;
receive the motion trajectory collected by the wearable device;
judge whether the received motion trajectory is a preset motion trajectory;

trigger the mobile terminal to take a photo if the received motion trajectory is the preset motion trajectory;
detect that the mobile terminal is switched from the photographing mode to a non-photographing mode; and
send a detection-terminating instruction to the wearable device, instructing the wearable device to stop sending a motion trajectory.

7. The mobile terminal of claim 6, wherein the received motion trajectory is a first motion trajectory, and the processor is further configured to:
monitor whether the mobile terminal receives a second motion trajectory collected by the wearable device if the first motion trajectory is not the preset motion trajectory; and
judge whether the second motion trajectory is the preset motion trajectory if the wearable device receives the second motion trajectory.

8. The mobile terminal of claim 6, wherein the processor is further configured to:
send a prompting instruction to the wearable device if the received motion trajectory is the preset motion trajectory, the prompting instruction being configured to instruct the wearable device to prompt a user that the photographing is triggered successfully.

9. The mobile terminal of claim 6, wherein the processor is further configured to perform at least one of:
triggering the mobile terminal to take a single photo when only one motion trajectory received within a preset time period is a first preset motion trajectory; and triggering the mobile terminal to take multiple photos in succession when at least two motion trajectories received within the preset time period are the first preset motion trajectory; or
triggering the mobile terminal to take a single photo when the received motion trajectory is a second preset motion trajectory, and triggering the mobile terminal to take multiple photos in succession when the received motion trajectory is a third preset motion trajectory.

10. The mobile terminal of claim 6, wherein the processor is further configured to:
receive a user operation for setting a preset motion trajectory;
generate an action-setting instruction according to the user operation;
send the action-setting instruction to the wearable device, for the wearable device to collect a current motion trajectory of the wearable device according to the action-setting instruction;
receive the current motion trajectory collected by the wearable device; and
set the current motion trajectory as the preset motion trajectory.

* * * * *